(12) United States Patent
Forsblom et al.

(10) Patent No.: US 9,401,100 B2
(45) Date of Patent: Jul. 26, 2016

(54) SELECTIVE MAP MARKER AGGREGATION

(75) Inventors: Nils Forsblom, La Quinta, CA (US); Toni Seppala, Hameenlinna (FI)

(73) Assignee: Adtile Technologies, Inc., San Diego, CA (US)

( * ) Notice: Subject to any disclaimer, the term of this patent is extended or adjusted under 35 U.S.C. 154(b) by 644 days.

(21) Appl. No.: 13/211,521

(22) Filed: Aug. 17, 2011

(65) Prior Publication Data

US 2013/0044137 A1 Feb. 21, 2013

(51) Int. Cl.
| | | |
|---|---|---|
| G09G 5/00 | (2006.01) | |
| G09B 29/10 | (2006.01) | |
| H04W 4/02 | (2009.01) | |
| H04W 4/20 | (2009.01) | |

(52) U.S. Cl.
CPC ............... *G09B 29/106* (2013.01); *H04W 4/02* (2013.01); *H04W 4/206* (2013.01)

(58) Field of Classification Search
None
See application file for complete search history.

(56) References Cited

U.S. PATENT DOCUMENTS

| | | | | |
|---|---|---|---|---|
| 7,738,883 B2* | 6/2010 | Hull | ...................... | G06Q 99/00 455/414.2 |
| 8,239,130 B1* | 8/2012 | Upstill et al. | .................. | 701/426 |
| 8,538,973 B1* | 9/2013 | Gonzalez | .................. | G06F 7/00 707/758 |
| 2006/0161535 A1* | 7/2006 | Holbrook | .......................... | 707/3 |
| 2007/0171716 A1* | 7/2007 | Wright et al. | ............. | 365/185.12 |
| 2009/0307168 A1* | 12/2009 | Bockius | ............ | G06F 17/30867 706/46 |
| 2010/0194783 A1* | 8/2010 | Kanamaru et al. | ............ | 345/660 |
| 2010/0198814 A1* | 8/2010 | Petersen et al. | ............... | 707/722 |
| 2010/0257165 A1* | 10/2010 | Jin | ...................... | G06F 17/3082 707/728 |
| 2011/0320423 A1* | 12/2011 | Gemmell et al. | ............. | 707/706 |

OTHER PUBLICATIONS

Ahern, Shane, et al. "World explorer: visualizing aggregate data from unstructured text in geo-referenced collections." Proceedings of the 7th ACM/IEEE-CS joint conference on Digital libraries. ACM, 2007.*
Pombinho, Paulo, Maria Beatriz Carmo, and Ana Paula Afonso. "Evaluation of overcluttering prevention techniques for mobile devices." Information Visualisation, 2009 13th International Conference. IEEE, 2009.*

* cited by examiner

*Primary Examiner* — Sultana M Zalalee
(74) *Attorney, Agent, or Firm* — Stetina Brunda Garred & Brucker (57) ABSTRACT

The selective aggregation of marker objects on a map is disclosed. A plurality of marker objects is received in response to a query. The marker objects are each defined by a set of coordinates to a specific location on the map. The map is segregated into a plurality of bounding areas each defined by a set of bounding coordinates. A bounding area count of the number of marker objects having coordinates within a first one of the bounding areas is generated. The bounding area count is compared to a predetermined threshold. If the bounding area count is greater, a first aggregate marker is displayed in the first one of the bounding areas of the map. Otherwise, each of the marker objects within the first one of the bounding areas of the map is displayed. The marker objects are positioned according to the set of coordinates associated therewith.

17 Claims, 5 Drawing Sheets

SELECTIVE MAP MARKER AGGREGATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to location-based services, and more particularly to selective map marker aggregation of query results of search engines, social networking sites, and other online services.

2. Related Art

Geographic mapping applications are particularly suitable for computer-based implementations because of the high volumes of data involved, and because interactive graphics display capabilities lend well to visual map navigation. Accordingly, a wide variety of electronic mapping applications have been developed. Earlier commercially available mapping applications were offered as standalone products installable on desktop computers, and included interface software that retrieved and displayed map data stored locally on the hard drive, or on an optical storage medium such as a CDs and DVDs. Although some specialized Global Positioning System (GPS) devices continue to store map data locally, web-based mapping applications are becoming increasingly popular.

In so-called web mapping services, geographic data is stored on a remote database and is retrieved by a web service application that is accessed from a client computer system via a conventional web browser. There are several advantages to web mapping, chief among these being substantially decreased storage requirements on the client side, as well as the lack of a need for the end user to regularly update map data through purchased content and the like. Some of the earlier web mapping services utilized raster image data, in which each zoom or detail level is represented as a series of separate images that was indexed according to a coordinate system. Accordingly, retrieving and rendering maps was a computationally burdensome process on both the client end and the server end that was further delayed on a limited bandwidth Internet connection. Conventional web mapping services utilize vector data that is downloaded to the client and rendered by browser-side scripts cooperating with the web service application. Additional graphical data may be overlaid or otherwise tied to specific coordinates, including satellite imagery, traffic level indicators, street-level perspective images, point of interest graphics, and so forth. Providers of web mapping services have also made available application programming interfaces (API) so that data from any other web-based service can be incorporated into maps.

Due to the proliferation of GPS receiver modules in many different mobile computing platforms including smartphones, tablet devices, laptop computers, and the like, user geographic location data has become more available. Several online, web-based social networking sites have attempted to harness location data for further interactivity and utility in maintaining online and offline interpersonal relationships.

Generally, social networking involves connecting users with each other to communicate and share information. Users may establish accounts and create profiles containing biographic data such as current location, schools attended, employment experiences, personal relationships, and so forth. Furthermore, various updates of interest with messages, photographs, videos, and links to other sites may be posted on the profile. Access to this personal information may be limited to those who have approved and set up links or affiliations with the user account. Depending on preference, information of limited privacy concern may be made accessible to secondary contact links, or to all users on the social networking service. A group of contacts, which can minor the user's real-life personal network, may thus be established online.

When posting update content in messages, photographs, and videos, concurrently recorded location data may also be posted. The location data, in turn, may be utilized by a web mapping service to visually represent the location of each contact in the user's social network. Even though participation in social networking services through exchanging content can be enjoyable for its own sake, the capability to facilitate in-person, real-life interaction continues to be a significant draw and reason for its popularity, as offline contact often proves to be a richer, more rewarding experience.

Besides showing the location of users on social networking sites, the integration of location data from different sources into a web mapping service is applicable to other contexts. For instance, a common Internet search query relates to finding local businesses with physical facilities such as retailers, restaurants, and so forth. Markers overlaid on locations for businesses corresponding to the search results are helpful for quickly visualizing and deciding which (or in which order) they can be visited, among numerous other uses.

Visually presenting numerous location point data on a map may be challenging due to the limited space in which they may be shown. This problem is compounded where numerous query results are returned, and an attempt to render the location point data may result in a disorganized clutter. Furthermore, the maximum number of location point data that can be rendered on the map at any given point is also limited by the data processing resources of the client computer system. Some search engine implementations attempt to break up the results into multiple segments, with only the location point data for a given segment of results being rendered on the map at any time. Although this may decrease clutter on the map, a complete picture of the query cannot be visualized. The navigation of the query results becomes entirely divorced from the visual navigation of the map, with the map becoming a mere secondary indicator that complicates mental process of parsing search queries. Accordingly, there is a need in the art for selective map marker aggregation.

BRIEF SUMMARY

In accordance with one embodiment of the present disclosure, a method for selectively aggregating marker objects on a map is contemplated. The method may include receiving a plurality of marker objects in response to a query. The marker objects may each be defined by a set of coordinates to a specific location on the map. There may be a step of segmenting the map into a plurality of bounding areas. Each of the bounding areas may be defined by a set of bounding coordinates. The method may further include generating a bounding area count of the number of marker objects that have coordinates within a first one of the bounding areas. Additionally, the method may include comparing the bounding area count to a predetermined threshold. If the bounding area count is greater than the predetermined threshold, the method may include displaying a first aggregate marker in the first one of the bounding areas of the map. On the other hand, if the bounding area count is less than the predetermined threshold, the method may instead include displaying each of the marker objects within the first one of the bounding areas of the map. The marker objects may be positioned according to the set of coordinates associated therewith. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Various methods and systems for selective map marker aggregation are disclosed. Multiple results from a location-based query can be aggregated into a single marker, depending on the number of results that would otherwise have been overlaid in a given bounding area on the map. These methods may be implemented as executable software instructions. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
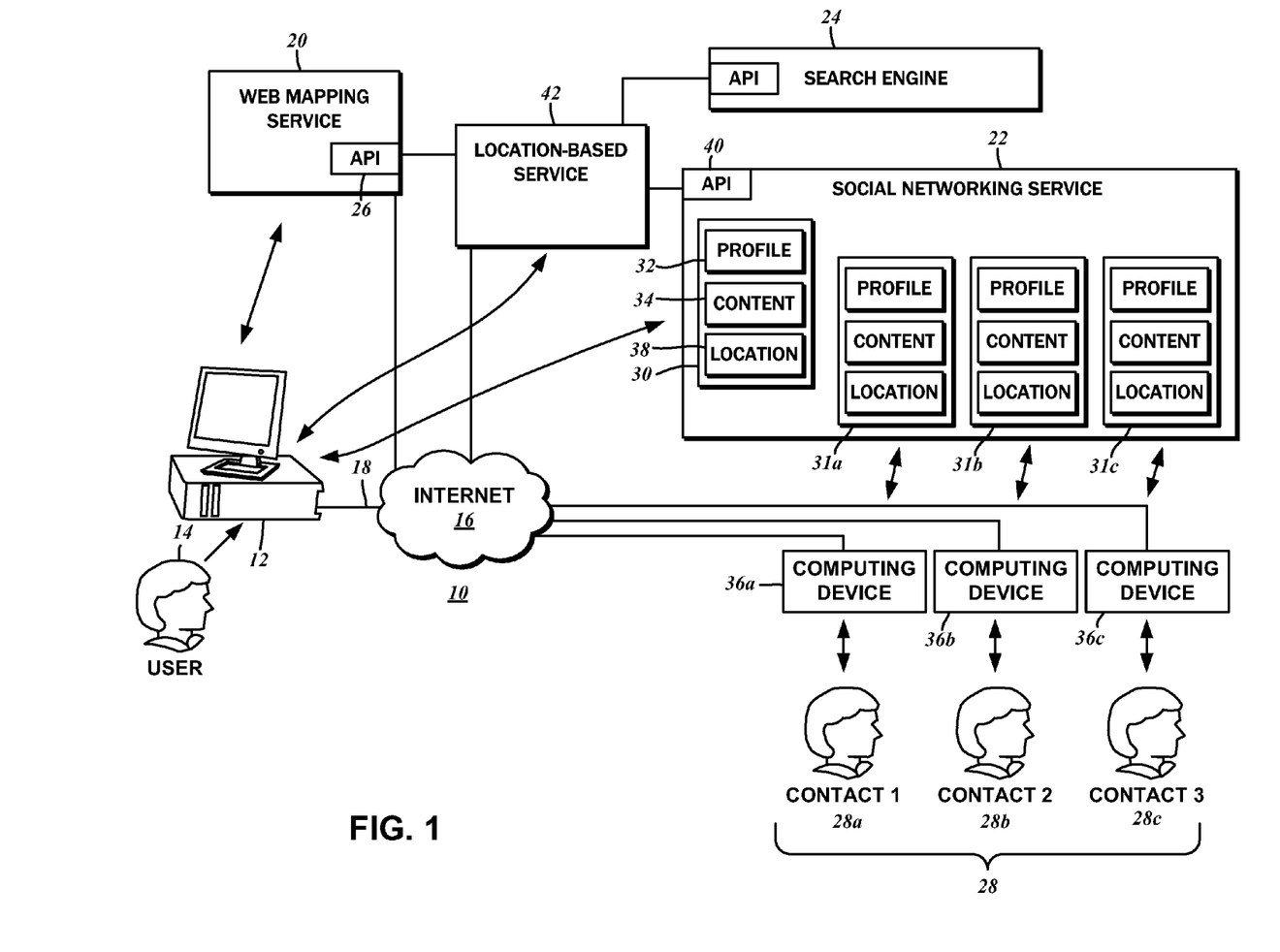
FIG. 1 is a block diagram illustrating one exemplary environment in which various embodiments of the present disclosure may be implemented, including a client computer system, a web mapping service, and an external location data source.

FIG. 1 is a generalized depiction of an example networked computing environment 10 where the selective map marker aggregation methods and systems may be implemented. Although specific components thereof are described, those having ordinary skill in the art will recognize that any other suitable component may be substituted. One component is a client computer system 12 operated by a primary user 14. The client computer system 12 may be a conventional personal computer device including a central processing unit, memory, and various input and output devices such as keyboards, mice, and display units. The client computer system 12 is connectible to the global Internet 16 via an Internet link 18.

The client computer system 12 is understood to have executable instructions of a web browser application that are loaded thereon. The web browser application communicates with various web servers also connected to the Internet 16 over the hypertext transfer protocol (HTTP), among others protocols known in the art. Requests for data are initiated by the client computer system 12 and transmitted to the servers, while the server transmits the requested data to the client computer system 12.

Among the services accessible via the Internet 16 include a web mapping service 20, a social networking service 22, and a search engine 24. It will be understood that there are several competing providers for each of these services, and each generally function in the same way, save for a few feature differences. In further detail, the web browser application on the client computer system 12 renders a map generated by the web mapping service 20 and retrieved from the same. The geographic locations to show, as well as the detail or zoom level at which such locations are shown, are specified through commands and queries issued via the web browser application. One of the most popular web mapping service 20 is the Google Maps though others such as Yahoo! Maps, Bing Maps, Mapquest, and so forth are available. The web mapping service 20 includes a mapping application programming interface (API) 26 through which additional content may overlaid on the generated map. Additionally, the API 26 can be used to incorporate mapping features into other websites such as the social networking service 22.

The social networking service 22 is understood to facilitate interactive online communications between the user 14 and the associated network of contacts 28 including a first contact 28a, a second contact 28b, and a third contact 28c, among possibly many others. As indicated above, numerous social networking services are known in the art, and any one may be utilized in connection with various embodiments of the present disclosure, including the previously mentioned Facebook, Google Plus, MySpace, Friendster, etc. Each provides a slightly different user experience, though there are some key features that are common to all. These commonalities include a specific user account 30 that is assigned to the primary user 14, as well as a viewable profile 32 containing biographic information and user-generated content 34.

The contacts 28a-c of the user 14 likewise have corresponding accounts 31a-c on the social networking service 22, along with corresponding profiles 32 and user-generated content 34. Each of the contacts 28 accesses the Internet 16 via a computing device 36, which is similar to the client computer system 12. In some embodiments, the computing device 36 may be a mobile device such as a smart phone, a laptop computer, a tablet computer, or the like that has Internet connectivity features. The computing device 36 is understood to have a web browser application or other dedicated application for accessing the data stored on the social networking service 22, and also capable of rendering maps retrieved from the web mapping service 20. For purposes of the present disclosure, the computing device 36 will be referenced as a specific kind of the client computer system 12, and thus the terms are, for the most part, interchangeable.

Communications between the user 14 and the contacts 28 via the respective profiles 32 can be facilitated in public, semi-private, and private settings. The primary user account 30 is linked to the accounts 31a-31c associated with the contacts 28a-28c, such that content posted to the profile 32 of the primary user 14 is viewable thereby. Depending on the particular service, the feature of posting user-generated content may be variously referred to as a "wall," or a "stream." The user-generated content 34 may be text messages, photographs, videos, and links to other websites on the Internet 16. Additionally, such data may be appended with location data 38. As indicated above, the social networking service 22 may be accessed by the contacts 28 with mobile devices, which typically include GPS receivers incorporated therein. The coordinate values corresponding to the geographical position of the mobile device can be recorded, transmitted to the social networking service 22, and displayed together with the user-generated content 34. By utilizing the mapping API 26, the location can be visualized with a map embedded into the web page of the social networking service 22.

The functionality of the social networking service 22 may be extendible through third party application providers that employ the data associated with the user accounts 30 in different ways from the social networking service 22 itself. Accordingly, there is a social networking API 40 that can be accessed by an application provider to access and retrieve the data on the social networking service 22. In addition, the social networking API 40 can be used by the application provider to generate further content for the social networking service 22. As noted above, the present disclosure contemplates methods and systems for selective map marker aggregation. The web mapping service 20 is used to generate the map, and the social networking service 22 is used to obtain the data points for the markers that are overlaid on the marks. The resultant map can be generated as part of the webpage of the social networking service 22, or alternatively, on a separate independent webpage. In one embodiment, this feature is provided by an external location based service 42 that connects to the social networking API 40 and the mapping API 26. It will be recognized by those having ordinary skill in the art, however, that the functionality may be directly incorporated into the web mapping service 20, or in the social networking service 22. Although the details of the present disclosure will be explained in relation to the social networking service 22, it is understood that the contemplated map marker aggregation methods and systems are applicable in other contexts. This includes the search engine 24, various online review services, or any other online service that includes location data which can be visually represented as markers on the map.

Figure 2:
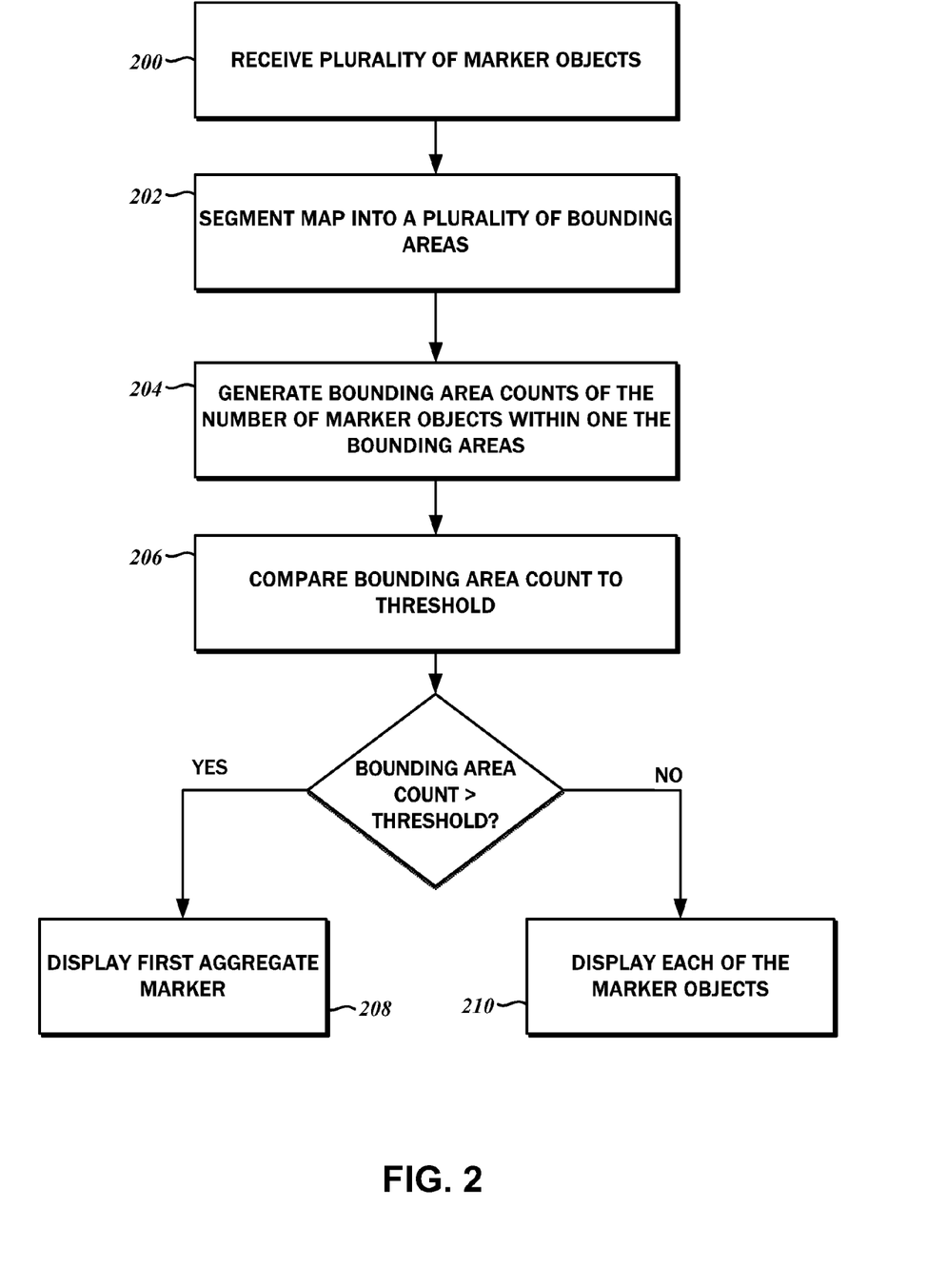
FIG. 2 is a flowchart showing one method for selectively aggregating marker objects on a map.

Referring now to the flowchart of FIG. 2, the method begins with a step 200 of receiving a plurality of marker objects in response to a query. As utilized herein, and in the context of the social networking service 22, the marker object is understood to be a data object that is at least partially defined by a set of coordinates to a specific location on the map. Furthermore, the data object may include a field identifying the particular user and the profile 32 to which the location data 38 is associated. The query may be a general one made to the social networking service 22 by the location based service 42 to retrieve the profiles 32 of all contacts 28 of the user 14. The query may also be narrower, with only a subset of the profiles 32 that meet a specified criteria being retrieved. The particular way in which such queries are directed to the social networking service 22 will be recognized by those having ordinary skill in the art.

Figure 3:
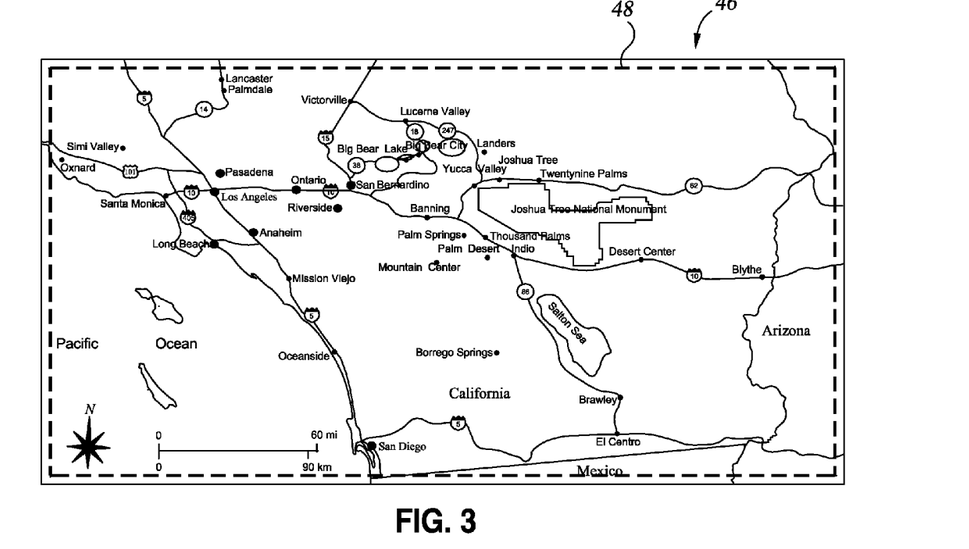
FIG. 3 is an exemplary web mapping service interface showing a map of a geographical location.

FIG. 3 illustrates an exemplary map 46 that depicts a particular geographic region. Another embodiment envisions the aforementioned query involving the retrieval of marker objects that have coordinates within a region boundary 48. Thus, the query is matched to the zoom level of the map (map-centric implementation), rather than adjusting the zoom level of the map to show the results from a query (social network-centric implementation) as previously described. In either case, a request is made to a data store for marker objects represented by coordinate values.

Figure 4:
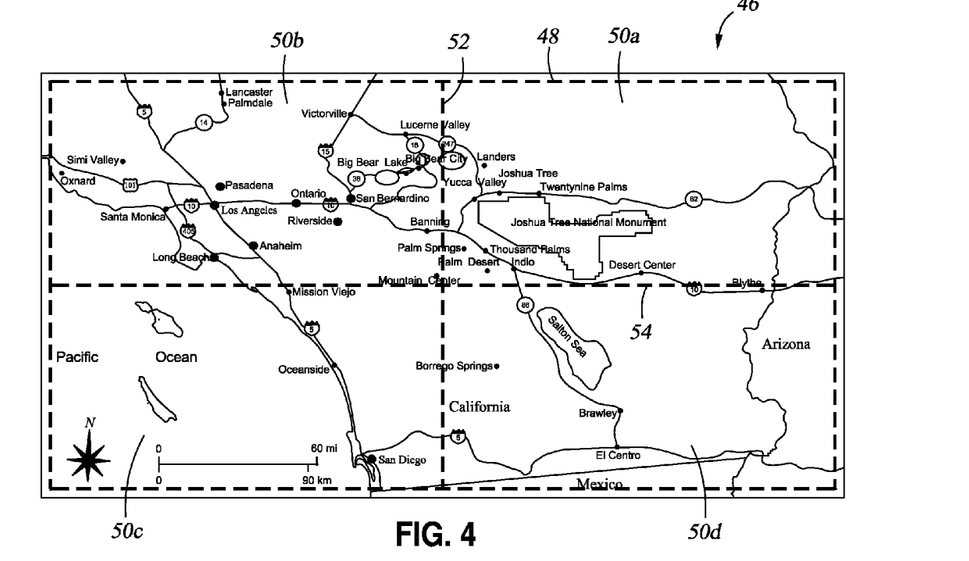
FIG. 4 is the web mapping service interface showing the map with otherwise hidden bounding areas illustrated as broken lines.

If it is determined that the region boundary 48 includes too many retrieved marker objects, i.e., the count of the marker objects with coordinate values within the region boundary 48 exceeds a certain threshold, the method continues with a step 202 of segmenting the map into a plurality of bounding areas 50, including a northeast bounding area 50a, a northwest bounding area 50b, a southwest bounding area 50c, and a southeast bounding area 50d. The illustrated embodiment of FIG. 4 shows that the bounding areas 50 are adjacent to each other, and have a generally quadrangular configuration. It is also illustrated that there are four bounding areas 50 segregated by a vertical boundary line 52 and a horizontal boundary line 54, which, like the region boundary 48, are not rendered visible to the client computer system 12. It will be recognized that there may be a different number of bounding areas 50 with other shapes, depending on the geography of the region shown on the map. The borders of the bounding areas 50 is shown by way of example only, and in most embodiments this is hidden or rendered invisible on the map 46.

In step 204, the method continues with generating a bounding area count of the number of marker objects having coordinates within a first one of the bounding areas 50, for example, the northeast bounding area 50a. The step 204 may be repeated for each of the remaining bounding areas 50b-50c, with a separate bounding area count being generated therefor. Broadly, if the density of marker objects for any bounding area 50 is sufficiently low, then each of the marker objects therein can be shown. On the other hand, if the density of marker objects in the particular bounding area 50 is too high, that is, where too much visual clutter would result by displaying each of the marker objects in that bounding area 50, they are not displayed and instead represented with an aggregate marker.

With reference again to the flowchart of FIG. 3, the method includes a step 206 of comparing the bounding area count to a predetermined threshold value. For each of the bounding area counts generated for the bounding areas 50a-50c, this step is repeated. If the bounding area count is greater than the predetermined threshold, as shown in the northeast bounding area 50a of FIG. 5, a first aggregate marker 56a is displayed per step 208. The southeast bounding area 50d also, by way of example, has a bounding area count greater than the predetermined threshold value, so a second aggregate marker 56b is displayed, again according to step 208. However, where the bounding area count is less than the predetermined threshold value as is the case with the northwest bounding area 50b, the individual markers 58a, 58b are displayed in accordance with step 210.

Figure 5:
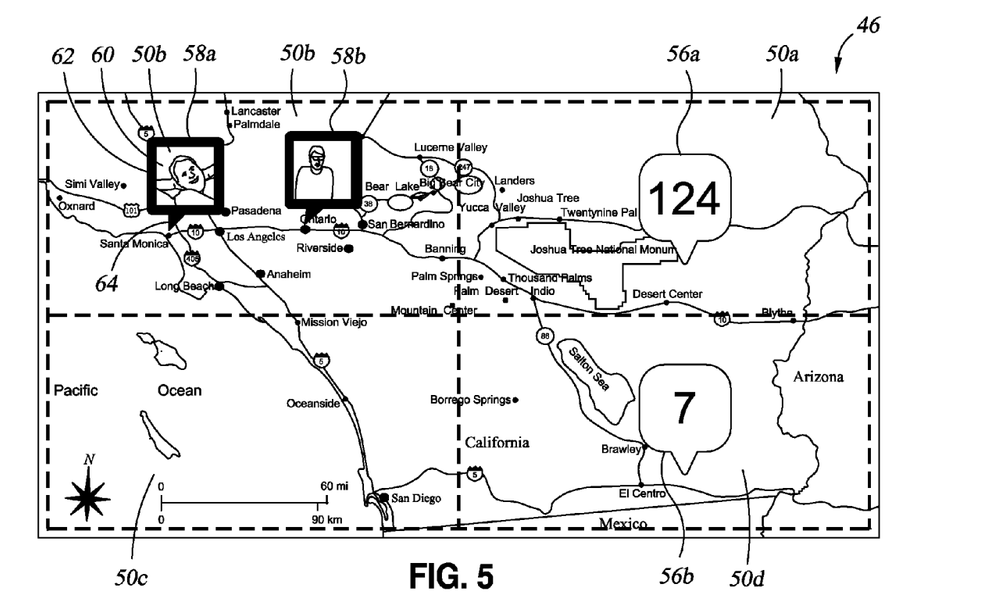
FIG. 5 is the web mapping service interface showing the map with aggregate markers and marker objects in accordance with various embodiments of the present disclosure.

The aggregate marker 56 may be implemented in a variety of different ways to convey representative information of its constituent marker objects. In its simplest form, the aggregate marker 56 is an icon including the number of marker objects within the particular bounding area 50. The first aggregate marker 56a indicates that there are 124 marker objects within the northeast bounding area 50a, while the second aggregate marker 56b indicates that there are 7 marker objects within the southeast bounding area 50d. As will be described more fully below, other information may be included in the aggregate markers 56. By way of example, the aggregate markers 56 may be positioned in a central region of the bounding area 50.

When utilized in conjunction with the social networking service 22, the individual markers 58 may include a photograph 60 or other identifying graphic that is associated with the corresponding user account 31. The markers 58 are positioned on the map 46 in accordance with the location data 38 associated with the corresponding user account 31. Because the comparatively large photograph 60 likely would not point to the specific location with any degree of precision, it may be embedded within an icon 62 having a pinpoint section 64. This is shown by way of example only and not of limitation; other implementations may be substituted without departing from the scope of the present disclosure.

Figure 6:
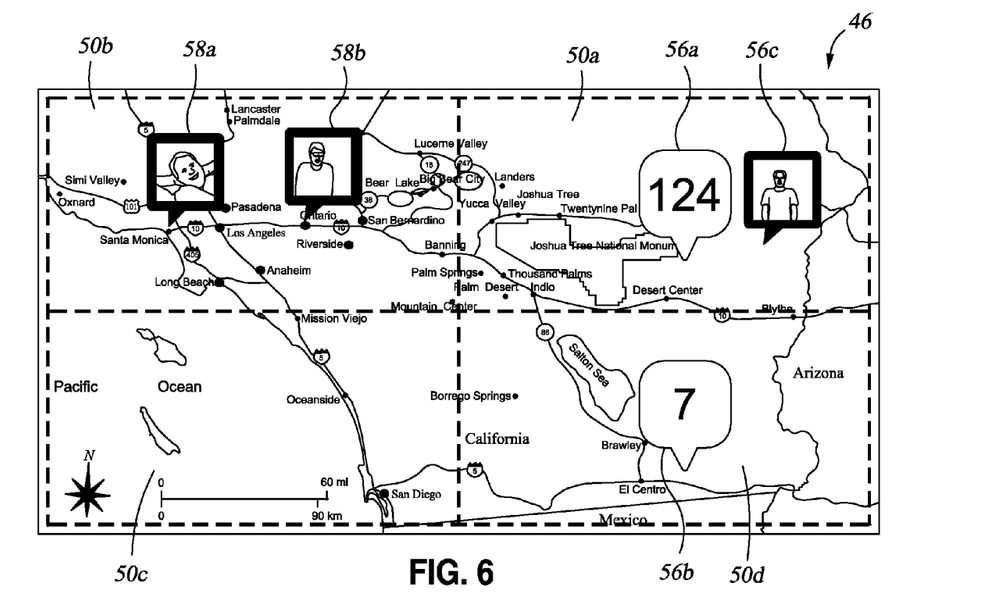
FIG. 6 is the web mapping service interface showing the map with an aggregate marker together with a marker object in a single bounding area.

In some instances, even when the aggregate marker 56 is generated for a given bounding area 50, an individual marker 58 may nevertheless be displayed. The social networking service 22 stores additional data about the user 14 and the contacts 28 such as the profile 32 and the user-generated content 34. Where a specific contact 28 is likely to be of interest to the user 14 for one reason or another (for example, the user 14 and the contact 28 share the same hobby or activity) then the marker 58 therefor can be displayed as illustrated in FIG. 6. This determination may be based upon the derivation of a relevance value for each of the profiles 32 linked to the social network of the user 14. Again, although this example is illustrated in the context of the social networking service 22, this feature is also possible for other services in which marker objects representative of something other than contacts 28 are displayed on the map 46, such as restaurants, retail establishments, and the like. The particular example shows that the northeast bounding area 50a has 124 marker objects, and a particular contact 28 of interest as indicated by the marker 58c. In some instances, any number of additional markers 58 may be generated from a random selection of profiles 32.

Figure 7:
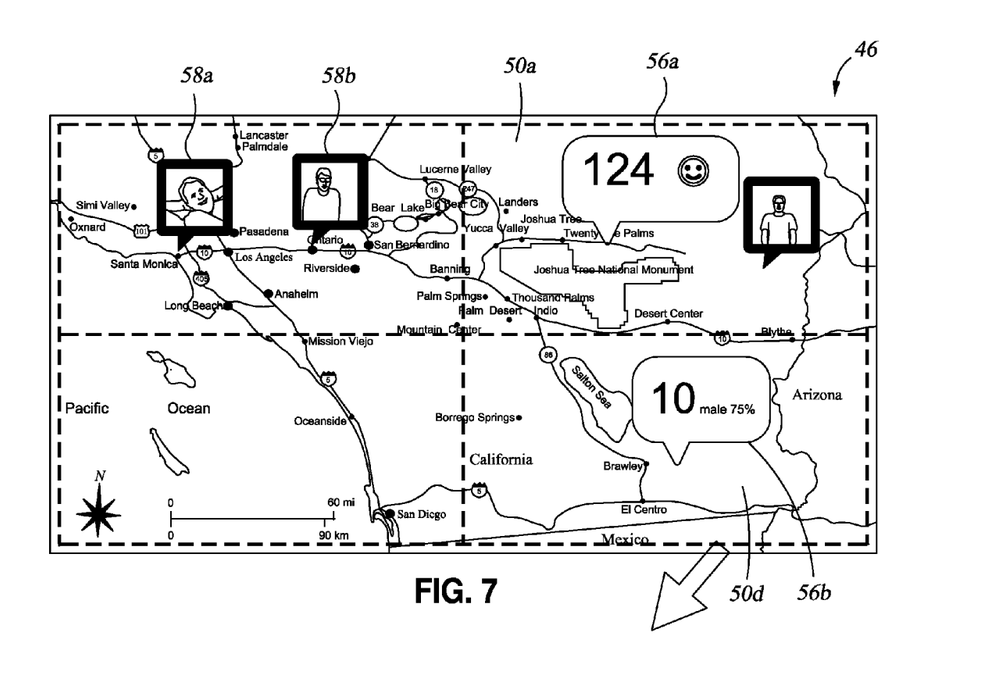
FIG. 7 is the web mapping service interface showing the map with the aggregate markers with additional demographic information that collectively represents the individual marker objects therein.

With reference to FIG. 7, several embodiments of the present disclosure contemplate additional information being provided in the aggregate markers 56 in the form of icons, colors, further text-based indicators, and so forth. For example, the first aggregate marker 56a may include an icon 66 that is representative of some demographic information culled from the profiles 32 of those contacts located within the northeast bounding area 50a. The second aggregate marker 56b indicates that the southeast bounding area 50d is comprised of 75% males, another demographic data point retrieved from the profiles 32.

Figure 8:
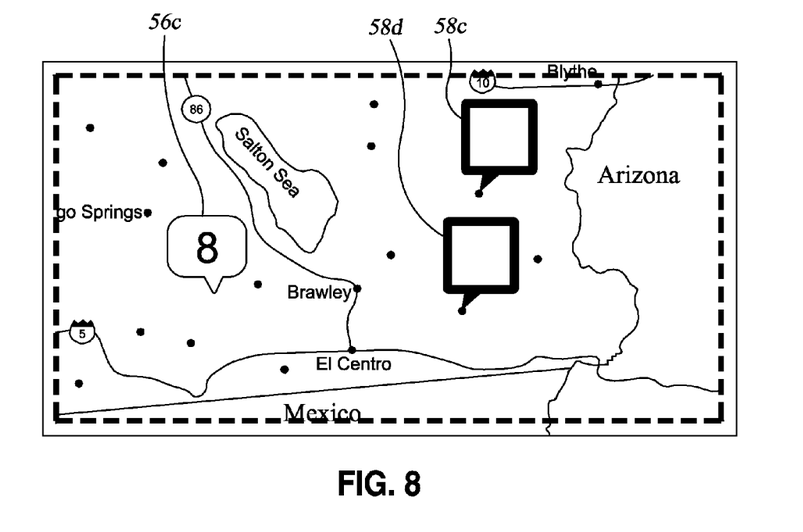
FIG. 8 is the web mapping service interface showing the map zoomed in on the first one of the bounding areas, with the selective aggregating method further applied thereto.

When a map zoom command is invoked, the above-described method of selectively aggregating marker objects including steps 200 through 210 is repeated for the new map view. Aside from conventional map navigation inputs to zoom out and zoom in to different views of the map, the map zoom command may also be invoked via a selection of the aggregate marker 56 with a mouse click or the like. By way of example, when the second aggregate marker 56b is selected, the view is expanded to show only the southeast bounding area 50d, as shown in FIG. 8. The southeast bounding area 50d is then segmented into multiple sub-bounding areas, each of which are defined by a set of sub-bounding coordinates. A count of marker objects in each of the sub-bounding areas is generated, and if the count for any one of the sub-bounding areas is greater than the predetermined threshold, then another third aggregate marker 56c is displayed therefor.

Otherwise, the individual markers 58c, 58d are displayed. While the foregoing zooming operation and subsequent marker aggregation process is described in terms of sub-bounding areas, it will be recognized that such description is for purposes of comparison to the original bounding areas 50 only. Various implementations perform the same operation recursively on the sub bounding areas as on the bounding areas 50. Accordingly, the same parameters are understood to apply, including the shape and number of bounding/sub-bounding areas.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for selectively aggregating marker objects on a map, the method comprising:
   receiving a plurality of marker objects in response to a query, the marker objects each being defined by a set of coordinates to a specific location on the map;
   segmenting the map into a plurality of bounding areas each defined by a set of bounding coordinates;
   generating a bounding area count of the number of marker objects having coordinates within a first one of the bounding areas;
   comparing the bounding area count to a predetermined threshold;
   if the bounding area count is greater than the predetermined threshold:
      deriving a relevance value for each of the marker objects within the first one of the bounding areas based upon data not directly responsive to the query and is retrieved from a data source using preexisting user data;
      displaying a first aggregate marker in the first one of the bounding areas of the map;
      displaying the marker objects with relevance values exceeding a predetermined relevance threshold within the first one of the bounding areas simultaneously with the first aggregate marker; and
   if the bounding area count is less than the predetermined threshold, displaying each of the marker objects within the first one of the bounding areas of the map positioned according to the set of coordinates associated therewith.

2. The method of claim 1, wherein the display of the first aggregate marker includes the bounding area count.

3. The method of claim 1, wherein the first aggregate marker is positioned on the map in a central region of the first one of the bounding areas.

4. The method of claim 1, wherein the map is segmented into equilateral quadrants of bounding areas.

5. The method of claim 1, wherein:
   the plurality of marker objects each corresponds to a user profile on a social networking site, the user profile including a geographic location value defined in the user profile associated with the set of coordinates of the corresponding marker object; and
   the query is made to the social networking site.

6. The method of claim 5, wherein a one of the user profiles includes an identifying graphic, the displayed marker object corresponding to the one of the user profiles including the identifying graphic.

7. The method of claim 5, wherein the first aggregate marker includes a visual representation of demographic data derived from a collection of the user profiles of the marker objects having coordinates within the first one of the bounding areas.

8. The method of claim 7, wherein the visual representation of the demographic data is selected from a group consisting of: color, graphics, and text.

9. The method of claim 5, further comprising:
deriving a relevance value for each of the user profiles; and
displaying a one of the marker objects within the first one of the bounding areas of the map positioned in accordance with the set of coordinates associated therewith based upon the relevance value therefor;
wherein the first aggregate marker is being displayed in the first bounding area.

10. The method of claim 9, wherein the relevance value is based upon data from the user profile.

11. The method of claim 1, further comprising:
displaying a one of the marker objects within the first one of the bounding areas of the map positioned in accordance with the set of coordinates associated therewith based upon a random selection of the one of the marker objects.

12. The method of claim 1, further comprising:
segmenting the first one of the bounding areas of the map into a plurality of sub-bounding areas each defined by another set of sub-bounding coordinates;
generating a sub-bounding area count of the number of marker objects having coordinates within a first one of the sub-bounding areas;
comparing the sub-bounding area count to the predetermined threshold;
if the sub-bounding area count is greater than the predetermined threshold, displaying a second aggregate marker in the first sub-bounding area of the map; and
if the sub-bounding area count is less than the predetermined threshold, displaying each of the marker objects within the first sub-bounding area of the map positioned in accordance with the set of coordinates associated therewith.

13. The method of claim 12, wherein the first one of the bounding areas of the map is segmented into the plurality of sub-bounding areas in response to a map zoom command.

14. The method of claim 13, wherein the map zoom command is generated upon user input corresponding to a selection of the first aggregate marker.

15. The method of claim 12, wherein the bounding area is segmented into equilateral quadrants of sub-bounding areas.

16. The method of claim 12, wherein the display of the second aggregate marker includes the sub-bounding area count.

17. An article of manufacture comprising a non-transitory program storage medium readable by a computer, the medium tangibly embodying one or more programs of instructions executable by the computer to perform a method for selectively aggregating marker objects on a map, the method comprising:
receiving a plurality of marker objects in response to a query, the marker objects each being defined by a set of coordinates to a specific location on the map;
segmenting the map into a plurality of bounding areas each defined by a set of bounding coordinates;
generating a bounding area count of the number of marker objects having coordinates within a first one of the bounding areas;
comparing the bounding area count to a predetermined threshold;
if the bounding area count is greater than the predetermined threshold:
deriving a relevance value for each of the marker objects within the first one of the bounding areas based upon data not directly responsive to the query and is retrieved from a data source using preexisting user data;
displaying a first aggregate marker in the first one of the bounding areas of the map;
displaying the marker objects with relevance values exceeding a predetermined relevance threshold within the first one of the bounding areas simultaneously with the first aggregate marker; and
if the bounding area count is less than the predetermined threshold, displaying each of the marker objects within the first one of the bounding areas of the map positioned according to the set of coordinates associated therewith.

* * * * *